Figure 1:
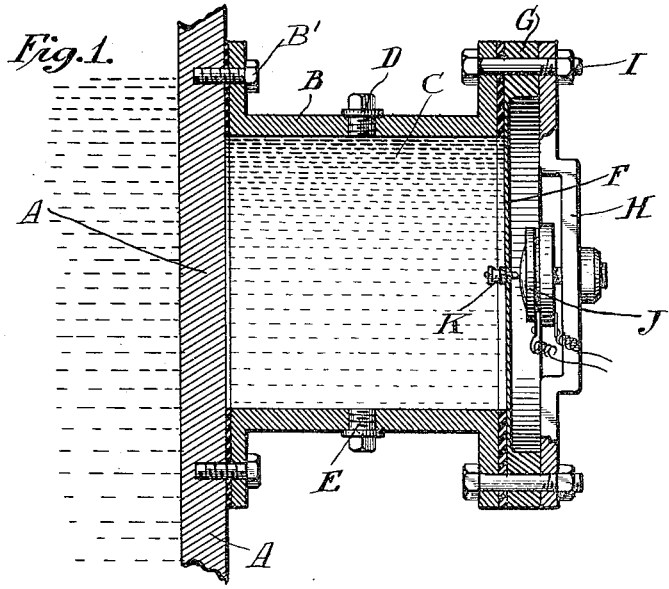

C. BERGER.
SUBMARINE SIGNALING APPARATUS.
APPLICATION FILED NOV. 4, 1912.

1,117,766.

Patented Nov. 17, 1914.

Attest:
O. Mitchell
E. B. King.

Christian Berger, Inventor,
by Rogers, Kennedy & Campbell,
his Attys.

UNITED STATES PATENT OFFICE.

CHRISTIAN BERGER, OF NEW YORK, N. Y., ASSIGNOR TO SUBMARINE WIRELESS COMPANY, A CORPORATION OF NEW YORK.

SUBMARINE SIGNALING APPARATUS.

1,117,766.  Specification of Letters Patent. Patented Nov. 17, 1914.

Application filed November 4, 1912. Serial No. 729,535.

*To all whom it may concern:*

Be it known that I, CHRISTIAN BERGER, a subject of the King of Hungary, residing at New York city, in the county of New York and State of New York, have invented certain new and useful Improvements in Submarine Signaling Apparatus, of which the following is a specification, reference being had therein to the accompanying drawing.

My invention relates to submarine signaling apparatus, and more particularly to a receiving apparatus to enable the detection, and transmission to an instrument or observer, of sound vibrations existing in the surrounding open water.

A theoretically ideal receiving apparatus is one wherein the sensitive device or microphone is located directly in the open water outside of the ship or station where the signals are received, but from a practical standpoint that arrangement is recognized to be generally impractical on account of the necessity of relative motion between the ship and the water, and therefore between the sensitive instrument and the water, which interferes with the operation of the instrument. Arrangements have been devised for locating the sensitive device or microphone in the interior of the ship. All such apparatuses, however, heretofore known have proved unsatisfactory for numerous reasons.

It is an object of the present invention to enable the sensitive device or microphone to be interiorly located in an effective and satisfactory manner, overcoming the objections in prior apparatuses, and by a construction and arrangement which is not only simple, but is durable and is easily accessible for repair, adjustment and the like.

The several other general and detail objects of the present invention will appear during the hereinafter following description, and still other advantages will be obvious to those acquainted with the art of submarine signaling.

To the attainment of the several objects and advantages referred to, the present invention consists in the novel features of construction, combination, arrangement, design and detail hereinafter described and illustrated.

The general operation of the present invention is that the shell of the floating vessel has within it and located opposite a portion of the shell a vibratable diaphragm, which is so arranged by means of connecting walls as to inclose between the shell and the diaphragm a chamber which is filled with a suitable sound transmitting material, there being a sensitive microphone located also inside the shell, but outside of the chamber, and operatively connected with the diaphragm, so that any signal vibrations passing through the shell and the material within the chamber will act upon the interior diaphragm so that the latter causes the operation of the microphone which affects the current in an electric circuit or in other usual manner makes its variations known to the operator who is receiving the signal. According to another branch of this invention and irrespective of the location of the microphone, it is proposed to employ as a sound transmitting material within an interior chamber a jelly-like material or colloid having sufficiently small internal friction to afford high sound transmitting qualities.

I will first describe one or more forms in which the present invention may be embodied, and will thereafter point out the novel features in the claims.

Figure 2:
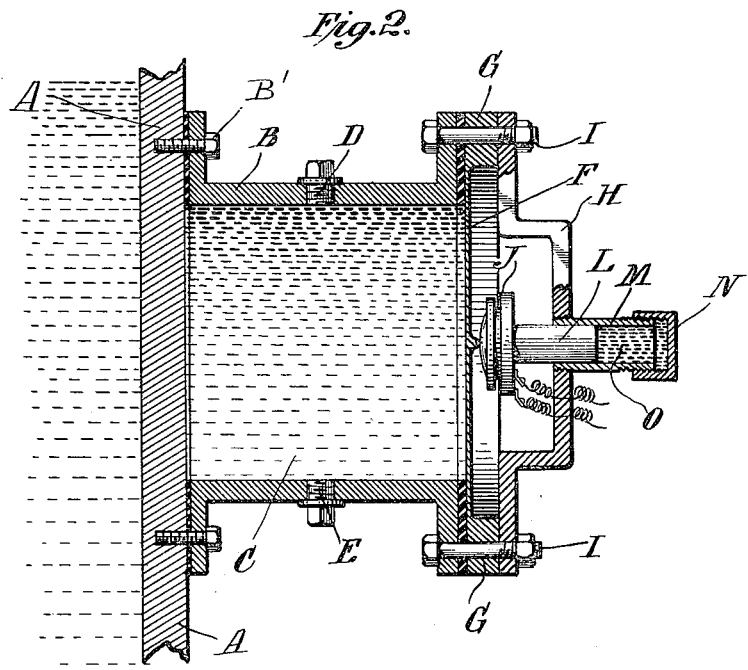

In the accompanying drawings forming a part hereof, Figure 1 represents substantially in vertical central cross-section one form of signal receiving apparatus embodying my invention. Fig. 2 is a similar view of a modified form of apparatus.

The same reference characters designate corresponding parts in the two figures of the drawings.

An exterior plate or shell A may be the vertical or side wall of a ship's hull. On the left side of this exterior shell A is shown open water, while the apparatus to be described is located on the other or interior side. I prefer that the shell be unperforated as shown, and one of the advantages of the present invention is that no perforation is necessitated. An interior wall or cylinder B is shown located adjacent the shell A serving as a means of forming a chamber inclosed between the shell and a suitably located diaphragm. Within the chamber may be placed a body of any vibration-transmitting incompressible but soft material, and in making this statement I use the associated words soft and incompressible as excluding ordinary solids and gases respectively. In other words, any nongaseous medium which is indentible or which is capable of being made to take the form of the containing chamber, is included, so long as it has sound conducting properties. Specifically liquids are included, such as water, wherein the particles move freely among themselves or flow; so also semi-liquids such as the viscous liquids, thick and slow of diffusion. I prefer, however, a different character of material, in which contrary to liquids and semi-liquids no diffusion or flowing takes place. I refer to what may be termed colloids,—jelly-like materials,—such as gelatin or albumen, and which are rather semi-solids than semi-liquids. These two kinds of plastic materials are importantly different in their characteristics and in their functions performed in an apparatus of the kind herein referred to. Indeed, one of the principal features of this improvement is the employment of a colloid or jelly-like material within the chamber. Actual experiment has shown that proper jelly-like materials possess radical differences in action as compared with liquids and a far better efficiency, which is comparable with the best efficiency of sound transmission in solids. The colloid is, indeed, a semi-solid as distinguished from a liquid, yet possesses a degree of plasticity enabling it to be filled into or formed within the chamber and with intimate molecular contact with the ship's shell and other surrounding surfaces. It is intended, however, to exclude those jellies or colloids which will not serve the purpose because not possessing the necessary high sound-transmitting qualities. Gelatin jelly is a typical example of a serviceable colloid. Ordinary elastic rubber would tend to insulate rather than transmit, and would be excluded. I attribute the difference to a question of internal friction. Ordinary caoutchouc appears to have high internal friction and, in one sense, comes between a gelatin jelly and a solid, but is a less efficient transmitter than either. Besides gelatin jelly there are other known colloids having apparently sufficiently low internal friction to serve the purposes of this invention.

Thus at C in the drawings is intended to be indicated a body of sound-transmitting soft but incompressible material, in the form of a colloid mass of low internal friction.

As to the details of the fittings of the wall or cylinder B, they will be within the ability of a skilled mechanic to vary indefinitely to suit circumstances. For convenience the wall B is shown as a flanged cylinder, one flange of which is connected directly against the exterior shell A by means of bolts B'. A screw plug or inlet D may be provided at the upper side for admitting the material C, while at the under side of the chamber an outlet E may be similarly arranged.

The interior wall or diaphragm F by being secured to the inner flange of cylinder B forms an inclosed chamber between the shell A and the diaphragm. I propose to locate the microphone outside rather than within the chamber by means of constituting the wall F opposed to the outer wall or shell a vibratable diaphragm. By this advantageous arrangement I am enabled to locate a sensitive device or microphone within the shell of the ship, and at the same time not within but outside of the chamber, preferably adjacent to the vibratable diaphragm F, thus easily accessible for the purposes before referred to, and also protected from corrosion and other injurious effects of immersion. By filling the chamber with a proper kind of jelly, we then have a body of vibration-transmitting colloidal material so maintained as to receive vibrations from the plate or shell and transmit the same for the actuation of the sensitive device. It will be understood that the vibrations are of small amplitude, and, indeed, of a character largely or wholly molecular as distinguished from molar, so that there is practically no bodily movement of the shell, jelly or diaphragm, but rather a wave of molecular disturbance which passes to and affects the microphone.

As a very advantageous feature, in connection with a vibratable diaphragm employed in such a combination, I have shown the diaphragm constructed in its central portion as of the necessary thinness to readily take vibrations, while at its periphery the material or metal is of comparatively great thickness or weight. Thus the integral heavy ring G and the comparatively thin central portion of the diaphragm constitute a superior device having the qualities of strength, efficiency and ease of attachment. Preferably the diaphragm of this construction will be made from a solid disk of metal turned down at its interior or central part at one or both sides, preferably at one side as shown.

While it is not in all cases necessary, I have shown in Fig. 1 a means of supporting a microphone at its rear while actuated from the diaphragm F at its front, namely the bridge H extending from one side to the other and secured for convenience by the same bolts I which secure the diaphragm G to the flanges of the wall or casing B. The sensitive device J, while it may take various forms, is preferably a microphone, for example of the type designated as the solid-back microphone, in the use of which the rear portion is secured to the bridge H or corresponding part, while the front of the microphone is in operative relation with the vibratable diaphragm F. The diaphragm may have an adjusting device K for securing proper relation between it and the microphone. With this arrangement the rear of the microphone is stationarily held by the bridge while the forward end is oscillated through the diaphragm, thus as usual changing the resistance in an electric circuit which extends to an observer or proper instrument for taking note of the vibratory impulses.

In the modification of Fig. 2 the arrangement of the microphone is somewhat varied, it here having a rear stud L which is shown slidingly engaged in a cylinder or cup M having a cap N for opening and closing it, and containing a supply of vaseline O. This arrangement while holding the back of the microphone substantially solid for the purpose of rendering it operable by the diaphragm's vibration, permits a bodily movement of the microphone or a yielding thereof when necessary to take up shocks or avoid breakage of the parts.

The vibratable diaphragm F already referred to may be employed for submarine signaling under other conditions than those recited. Its comparatively thin metallic membrane may approximately be from one-half to one millimeter in thickness, and the comparatively thick integral rim or periphery surrounding the thin area may be many times thicker and of a convenient thickness to enable the bolting or other attachment of the diaphragm in place. Thus an effective non-leakable fitting is easily afforded and one wherein the thinner metallic portions are subject to a minimum strain or liability to breakage. The construction described is therefore well adapted to be contacted by a liquid or a colloid at one side only, and to coöperate with a sensitive device or microphone at the other side of the diaphragm.

In their shown proportions the parts in the drawings are merely illustrative of the principles involved, and the dimensions will be adopted in actual practice to suit the conditions. For example, the diameter of the casing B or the chamber inclosed by it will be relatively much larger than as shown as compared with the size of the diaphragm and microphone; and the chamber walls might be more of a cone-like than cylindrical form so as to encompass a much greater area of the plate A as compared with the smaller area of the diaphragm.

It will be seen that the above described embodiments accomplish the objects and advantages hereinbefore referred to.

Since many specific features of combination, arrangement and detail may be indefinitely varied I do not wish to be restricted thereto excepting to the extent specified in the appended claims.

What I claim and desire to secure by Letters Patent is:

1. For submarine signaling the combination of an exterior plate or shell and a vibratable interior diaphragm, the two arranged to mutually inclose a chamber, a vibration-transmitting material within such chamber, an interior microphone located outside said chamber, and having a rear plunger or shank, a cylinder in which said plunger slides, and material within said cylinder for imposing yielding resistance to such sliding.

2. For submarine signaling the combination of the exterior plate or shell of a hollow immersed vessel, a vibratable interior diaphragm opposed to said plate, the two arranged to mutually inclose a chamber, a jelly-like material filling said chamber, and a microphone located within said vessel but without said chamber and operatively connected for operation from said diaphragm.

3. For submarine signaling the combination of the exterior plate of a hollow immersed vessel, a vibratable interior diaphragm opposed to said plate, the two arranged to mutually inclose a chamber, a jelly-like material of sufficiently low internal friction to afford high sound transmitting qualities in said chamber, and a microphone located within said vessel but without said chamber and operatively connected for operation from said diaphragm.

4. A submarine signal receiving apparatus including in combination a plate in exterior contact with the water, an interior microphone, and a body of jelly-like material of high sound transmitting qualities so maintained as to receive vibrations from said plate and transmit the same for the actuation of said microphone.

5. A submarine signal receiving apparatus including in combination a plate in exterior contact with the water, an interior microphone, inclosing walls forming a chamber directly against the interior side of said plate, and a body of jelly-like material of high sound transmitting qualities so maintained in said chamber as to receive vibrations from said plate and transmit the same for the actuation of said microphone.

In testimony whereof I affix my signature in presence of two witnesses.

CHRISTIAN BERGER.

Witnesses:
JOHN H. DANIELS,
JOHN M. RUSSELL.